United States Patent
Conway

(10) Patent No.: US 9,932,516 B2
(45) Date of Patent: Apr. 3, 2018

(54) SLICK-WATER FRACTURING USING TIME RELEASE METAL-COMPLEXING AGENT

(71) Applicant: Flex-Chem Holding Company, LLC, Weatherford, OK (US)

(72) Inventor: Andrew Bryce Conway, Weatherford, OK (US)

(73) Assignee: Flex-Chem Holding Company, LLC, Weatherford, OK (US)

( * ) Notice: Subject to any disclaimer, the term of this patent is extended or adjusted under 35 U.S.C. 154(b) by 0 days.

(21) Appl. No.: 14/845,696

(22) Filed: Sep. 4, 2015

(65) Prior Publication Data

US 2016/0068745 A1    Mar. 10, 2016

Related U.S. Application Data

(60) Provisional application No. 62/045,967, filed on Sep. 4, 2014.

(51) Int. Cl.
*C09K 8/70* (2006.01)
*C09K 8/88* (2006.01)
*C09K 8/92* (2006.01)

(52) U.S. Cl.
CPC ............... *C09K 8/70* (2013.01); *C09K 8/887* (2013.01); *C09K 8/92* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 3,960,736 A | 6/1976 | Free et al. | |
| 4,089,787 A | 5/1978 | Lybarger et al. | |
| 4,986,356 A | 1/1991 | Lockhardt et al. | |
| 5,223,159 A | 6/1993 | Smith et al. | |
| 5,224,546 A | 7/1993 | Smith et al. | |
| 5,346,010 A | 9/1994 | Adams et al. | |
| 5,497,830 A * | 3/1996 | Boles | C09K 8/74 166/300 |
| 5,944,446 A | 8/1999 | Hocking | |
| 6,162,766 A * | 12/2000 | Muir | C09K 8/62 428/403 |
| 6,225,262 B1 * | 5/2001 | Irwin | C09K 8/62 166/270 |
| 6,265,355 B1 | 7/2001 | Lai et al. | |
| 6,331,513 B1 | 12/2001 | Zaid et al. | |
| 6,435,277 B1 | 8/2002 | Qu et al. | |
| 6,436,880 B1 | 8/2002 | Frenier | |
| 6,527,051 B1 | 3/2003 | Reddy et al. | |
| 6,569,814 B1 | 5/2003 | Brady et al. | |
| 6,638,896 B1 | 10/2003 | Tibbles et al. | |
| 7,013,974 B2 | 3/2006 | Hanes, Jr. | |
| 7,159,658 B2 | 1/2007 | Frost et al. | |
| 7,192,908 B2 | 3/2007 | Frenier et al. | |
| 7,208,529 B2 | 4/2007 | Crews | |
| 7,306,041 B2 | 12/2007 | Milne et al. | |
| 7,527,103 B2 | 5/2009 | Huang et al. | |
| 7,906,463 B2 | 3/2011 | Starkey, II et al. | |
| 7,928,040 B2 | 4/2011 | Sanders et al. | |
| 8,071,511 B2 | 12/2011 | Welton et al. | |
| 8,312,929 B2 | 11/2012 | Freiner et al. | |
| 8,567,503 B2 | 10/2013 | Welton et al. | |
| 8,567,504 B2 | 10/2013 | Welton et al. | |
| 8,584,757 B2 | 11/2013 | Reyes | |
| 2002/0160920 A1 | 10/2002 | Dawson et al. | |
| 2003/0032562 A1 | 2/2003 | Grossman et al. | |
| 2005/0150520 A1 | 7/2005 | Gill et al. | |
| 2006/0124302 A1 | 6/2006 | Gupta et al. | |
| 2006/0142166 A1 | 6/2006 | Thomas | |
| 2008/0110621 A1 | 5/2008 | Montgomery | |
| 2009/0298721 A1 * | 12/2009 | Robb | C09K 8/12 507/209 |
| 2010/0294498 A1 | 11/2010 | Svoboda et al. | |
| 2011/0053811 A1 | 3/2011 | Horton et al. | |
| 2011/0214862 A1 * | 9/2011 | Horton | C09K 8/03 166/283 |
| 2011/0237470 A1 | 9/2011 | Li et al. | |
| 2011/0259592 A1 * | 10/2011 | Reyes | C09K 8/04 166/305.1 |
| 2011/0263466 A1 | 10/2011 | Rose | |
| 2012/0125626 A1 | 5/2012 | Constantine | |
| 2013/0056213 A1 | 3/2013 | Medvedev et al. | |

(Continued)

FOREIGN PATENT DOCUMENTS

WO    2009086954 A1    7/2009
WO    2012116032 A1    8/2012

(Continued)

OTHER PUBLICATIONS

Written Opinion, PCT/US2015/048634 dated Dec. 7, 2015, 5pgs.
International Search Report, PCT/US2015/048634 dated Dec. 7, 2015, 2pgs.
International Search Report and Written Opinion for Application No. PCT/US2014/062440 dated Feb. 13, 2015, 10 pgs.
International Search Report for Application No. PCT/US2015/25399 dated Jul. 8, 2015, 2pgs.
Written Opinion of the International Searching Authority for Application No. PCT/US2015/25399 dated Jul. 8, 2015, 5pgs.
Notification of Transmittal of the International Search Report and the Written Opinion of the International Searching Authority, or the Declaration for Application No. PCT/US2015/25399 dated Jul. 8, 2015, 1pg.
Rick McCurdy, High Rate Hydraulic Fracturing Additives in Non-Marcellus Unconventional Shales, May 2011, pp. 17-21, Proceedings of the Technical Workshops for the Hydraulic Fracturing Study: Chemical & Analytical Methods http://water.epa.gov/type/groundwater/uic/class2/hydraulicfracturing/upload/proceedingsofhfchemanalmethodsfinalmay2011.pdf, 122pgs.

(Continued)

*Primary Examiner* — Jeffrey Washville
(74) *Attorney, Agent, or Firm* — Merchant & Gould P.C.

(57) ABSTRACT

In a slick-water fracturing operation, a composition is used to prevent the interaction between a polymer in a water-based fracturing fluid and naturally-occurring metal ions. The composition includes a metal-complexing agent, such as a chelating agent. The chelating agent can also be biodegradable and is citric acid in embodiments. The metal-complexing agent can be coated with one or two coatings to create a time-released form. The time-released form prevents loss of the agent prior to delivery at the shale.

18 Claims, No Drawings

(56) References Cited

U.S. PATENT DOCUMENTS

| | | | |
|---|---|---|---|
| 2013/0157905 A1 | 6/2013 | Saini | |
| 2013/0210684 A1 | 8/2013 | Ballard | |
| 2013/0213657 A1* | 8/2013 | Dobson, Jr. | C09K 8/24 166/308.5 |
| 2013/0261032 A1 | 10/2013 | Ladva et al. | |
| 2013/0269936 A1 | 10/2013 | Reyes et al. | |
| 2013/0269941 A1* | 10/2013 | Reyes | E21B 43/16 166/300 |
| 2013/0269944 A1 | 10/2013 | Reyes et al. | |
| 2013/0274154 A1 | 10/2013 | Nasr-El-Din et al. | |
| 2013/0274155 A1 | 10/2013 | Nasr-El-Din et al. | |
| 2013/0303412 A1 | 11/2013 | Luyster et al. | |
| 2014/0116696 A1 | 5/2014 | Reyes | |
| 2014/0124205 A1 | 5/2014 | Nasr-El-Din et al. | |
| 2014/0151042 A1 | 6/2014 | Faugerstrom et al. | |
| 2015/0005204 A1 | 1/2015 | Alwattari | |
| 2015/0114653 A1 | 4/2015 | Conway | |

FOREIGN PATENT DOCUMENTS

| | | |
|---|---|---|
| WO | 2013019188 A1 | 2/2013 |
| WO | 2013081609 A1 | 6/2013 |
| WO | 2013173634 A1 | 11/2013 |

OTHER PUBLICATIONS

Jason Weidner, Chemical Additive Selection in Matrix Acidizing, Thesis, May 2011, http://repository.tamu.edu/bitstream/handle/1969.1/150930/Weidner,%20Jason.pdf?sequence=1, 95pgs.

Al-Harthy, et al., Options for High Temperature Well Stimulation, Dec. 1, 2008, Oilfield Review Winter 2008/2009; 20, No. 4, http://www.slb.com/~/media/Files/resources/oilfield_review/ors08/win08/options_for_high_temperature_well_stimulation.pdf, 11pgs.

Portier, et al., Review on Chemical Stimulation Techniques in Oil Industry and Applications to Geothermal Systems—Technical Report, Deep Heat Mining Association, Work Package 4, May 2007, http://engine.brgm.fr/Deliverables/Period2/ENGINE_D28_WP4_ChemicalStimulation_DHMA_052007.pdf, 34pgs.

Xu, et al., On modeling of chemical stimulation of enhanced geothermal system using high pH with chelating agent, Geofluids; Journal vol. 9; Related Information: Journal Publication Date: May 1, 2009; http://www.osti.gov/scitech/servlets/purl/962720, 30pgs.

Waterfront Product Information, Geogard SX—Amorphous Silica Control, 2014, http://www.wateradditives.com/components/com_jshopping/files/demo_products/Geogard_SX_GP_WF_pdf, 2pgs.

Ehsaan Nasir, Thesis for Texas A&M, May 2012, Effect of acid additives on spent acid flowback, http://repository.tamu.edu/bitstream/handle/1969.1/ETD-TAMU-2012-05-10933/NASIR-THESIS.pdf?sequence=2&isAllowed=y, 125pgs.

Frenier, et al., Use of Highly Acid-Soluble Chelating Agents in Well Stimulation Services, SPE Annual Technical Conference and Exhibition, Oct. 1-4, 2000, Dallas, Texas, https://www.onepetro.org/conference-paper/SPE-63242-MS, 12pgs.

Civan et al., Rigorous Modeling of Gas Transport in Nano-darcy Shale Porous Media under Extreme Pore Proximity and Elevated Pressure Conditions, Proceedings of the International Conference on Heat Transfer and Fluid Flow, Prague, Czech Republic, Aug. 11-12, 2014, Paper No. 208, http://avestia.com/HTFF2014_Proceedings/papers/208.pdf, 2pgs.

James Caputo, AAPL 57th Annual Meeting, Boston, Jun. 8-11, 2011, Shale Plays: Basic Geologic and Engineering Concepts, http://www.landman.org/docs/white-papers/03-caputo_aapl_shale_play_seminar_part1_final.pdf, 71pgs.

Tan Nguyen, New Mexico Tech, Well Design—Spring 2013 Power Point Presentation, 44pgs.

Geiver, The Slickwater Story, The Bakken magazine, http://thebakken.com/articles/711/the-slickwater-story, Jul. 14, 2014, 2pgs.

Huang R.Y.M.; Jarvis, N.R. 1973. Ionically crosslinked hydrophilic polymer membranes: Synthesis and measurement of transport properties, J Polym Sci 41: 117-127, 11 pgs.

Ahmed, E.M. 2015. Hydrogel: Preparation, characterization, and applications: A review, J Adv Res 6: 105-121, 17pgs.

Akin, H.; Hasirci, V.N.; Hasirci, N. 1990. Permeability properties of charged hydrogel-carrying membranes, Polymer 31 (2): 270-275, 6pgs.

Supplementary European Search Report & Written Opinion for EP15837970 dated Dec. 19, 2017, 8pgs.

* cited by examiner

SLICK-WATER FRACTURING USING TIME RELEASE METAL-COMPLEXING AGENT

RELATED APPLICATIONS

This application claims the benefit of U.S. Provisional Application No. 62/045,967, filed Sep. 4, 2014, which is hereby incorporated by reference in its entirety.

INTRODUCTION

Water-based fracturing fluids containing a friction-reducing polymer are called "slick water." Slick-water fracturing of oil and gas wells is conducted by pumping at high pressures and high velocities through a vertical and, usually, a horizontal section of a well. The well contains a well casing and, in some wells, tubing inside the casing. Perforations or ports in the casing are adjacent to targeted intervals of subterranean formations containing a hydrocarbon. Hydraulic pressure exerted on the formation, above the fracturing gradient, causes the formation to fracture, creating an extensive fracture network. Most often these formations have minimal permeability and include sandstone, shale or coals. Once the fracture or crack is initiated, pumping is continued, allowing the fracture to propagate.

Once the fracture has gained sufficient fracture width, a proppant such as sand is added to the fluid and is transported to the fracture system, partially filling the fracture network. After the desired amount of proppant is placed in the fracture, additional water-based fluid is pumped to flush the casing of any proppant that may have settled in the casing. On completion of the fracturing process, the well is opened, allowing a portion of the fluid to be recovered. As the pressure is relieved, the fracture closes onto the proppant, creating a conductive pathway needed to accelerate oil and gas recovery from the formation.

The water-based fracturing fluid can contain polymer and multiple chemical additives. The additives may include biocide, scale inhibitor, clay control additive, oxygen scavenger and surfactant that assist fluid recovery. To keep the fracturing treatments affordable, only minimal amounts of these additives are used. Each additive is normally liquid-based and is metered separately into the treatment fluid and mixed with water and other additives in the blender. The blender includes a 5- to 15-barrel tub with agitation devices. The additive concentrations are commonly expressed as gallons of additive per 1000 gallons of water (abbreviated as gallons per thousand or gpt). The additives typically are composed of a chemical that provides the desired function such as scale inhibition and a solvent, commonly water, alcohol or oil.

The polymer in slick-water fluids provides friction reduction during pumping of the fluid into a well. Friction reducers are commonly delivered to a well site as invert polymer emulsions (oil external) dispersions of polyacrylamide copolymers, such as 30% anionic polyacrylamide, non-ionic polyacrylamide, or cationic polyacrylamide. Typical loadings range from 0.1 to 1.0 gpt and the polymer activity typically ranges from 20% to 40% (by weight). Addition of friction reducers to the water allows the fluid to be pumped at higher velocities with the same surface pressure by maintaining laminar flow at the higher flow rates, minimizing pressure losses.

Slick-Water Fracturing Using Time Release Metal-Complexing Agent

This disclosure describes embodiments of methods and time-release compositions that can be used to prevent the interaction between the friction-reducing polymer and naturally occurring or introduced metal ions, thereby improving the performance of a slick-water fracturing operation. In one aspect, this disclosure describes a slick-water fracturing fluid comprising a friction reducer and a time-released form of a metal complexing agent.

In another aspect this disclosure describes a method for slick-water fracturing, including adding a time-released form of a metal-complexing agent to a slick-water fracturing fluid. In the method, the time-release form of the metal-complexing agent is added in an amount of about 1 pound per thousand gallons to about 50 pounds per thousand gallons. The method also includes introducing the combined slick-water fracturing fluid and time-released form of a metal complexing agent into a subterranean zone.

In yet another aspect, this disclosure describes a slick-water fracturing fluid including a friction reducing polymer and a time-released form of a metal complexing agent, where the time released form of the metal complexing agent is present in the slick-water fracturing fluid at about 0.1 pound per thousand gallons to about 50 pounds per thousand gallons.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

DETAILED DESCRIPTION

Before the slick water fracturing systems are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise. Thus, for example, reference to "a lithium hydroxide" is not to be taken as quantitatively or source limiting, reference to "a step" may include multiple steps, reference to "producing" or "products" of a reaction should not be taken to be all of the products of a reaction, and reference to "reacting" may include reference to one or more of such reaction steps. As such, the step of reacting can include multiple or repeated reaction of similar materials to produce identified reaction products This disclosure describes embodiments of methods and time-release compositions that can be used to prevent the interaction between the friction-reducing polymer and naturally occurring or introduced metal ions, thereby improving the performance of a slick-water fracturing operation.

In slick-water fracturing of hydrocarbon-bearing shales, the inventor has observed that the metal-rich environment of the gas shales reduces the effectiveness of slick-water fracturing. Without being held to a particular theory, it appears that the metals of the shale are interacting with the polymer in some way as to negatively impact the fracturing operation, possibly by forming a metal-polymer complex that reduces the polymer's effectiveness as a friction reducer, chemically or physically interact with the friction reducer in ways that produce undesirable effects or making it more difficult to remove the friction reducer from the fracture and wellbore after completion of the fracturing operation.

As mentioned above, this disclosure describes embodiments of methods and compositions that can be used to prevent the interaction between the polymer and naturally occurring metal ions, thereby improving the performance of a slick-water fracturing operation. In one embodiment, a metal-complexing agent, such as citric acid, may be provided as an additional additive to the slick-water fracturing operation. It is anticipated that the metal-complexing agent will preferentially bind with the metals found in the clay, thereby freeing the polymer to continue to perform its function as a friction reducer.

In an embodiment, the metal-complexing agent is provided in a form, type or delivery system that prevents loss of the agent prior to delivery at the shale (i.e., during the injection process). In this embodiment, the metal-complexing agent is encapsulated with a coating, such as a dry hydrophobic film forming material or a dry sparingly soluble material and particulate silica, may be formed on the particulate solid complexing agent. For example, solid citric acid may be encapsulated in a paraffin or cottonseed oil coating. Alternatively, the release time could be controlled or influenced by differential solubility or rate of dissolution of the metal-complexing agent in the transporting fluid as a result of injecting it into the wellbore and/or reservoir. For example, EDTA is slowly soluble at room temperature or low temperatures in which it could be mixed, and the solubility increases as the temperature of the fluid increases in the wellbore or reservoir.

In an alternative method, a second coating is also used comprising a porous cross-linked hydrophilic polymer such that when contacted with water it prevents the substantial dissolution of the encapsulated chemical for a selected time period. In another embodiment the metal-complexing agent could be preserved by a coating that can be disrupted by pressure changes or mechanical forces such as fracture closure. Several time-release encapsulation materials and techniques for use in hydraulic fracturing are known in the art and any suitable technique may be used that delivers the metal-complexing agent to the shale such that it is released at approximately the time that the polymer is being exposed to the metal-bearing formation. In another such an embodiment loss of the metal-complexing agent could be prevented prior to delivery at the shale by coating or adsorbing the metal-complexing agent to materials that release in response to changes in environmental redox potential, pH or ion exchange.

In a specific embodiment of this technology, solid citric acid may be provided in a time release form and added to the slick-water fracturing fluid in an amount of 0.1-50 pounds per thousand gallons (lb./Mgal). More particularly, between 0.5 and 25 lb./Mgal of slick-water fracturing fluid may be used in the first half of each treatment stage to place. And, in an embodiment about 2-5 lb./Mgal of slick-water fracturing fluid may be used in the first half of each treatment stage to place more of the treatment allocation at maximum depth in the propped fracture, and then 0.5-1 lb./Mgal of slick-water fracturing fluid may be used during the remainder of the stage. It is anticipated that the time release of the citric acid will preferentially form complexes with any available metal ions from the formation and, thereby, improve the fracturing achieved by the operation.

In some embodiments, the metal-complexing agent is a chelating agent, an alkali metal salt thereof, a non-alkali metal salt thereof, or any combination thereof may be included in the treatment fluids described herein. In some embodiments, the chelating agent may be biodegradable. Although use of a biodegradable chelating agent may be particularly advantageous in some embodiments of the present disclosure, there is no requirement to do so, and, in general, any suitable chelating agent may be used. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life.

In some embodiments, suitable chelating agents may include common chelating agent compounds such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, citric acid, any salt thereof, any derivative thereof, and the like. It is to be noted that NTA may be considered to be a biodegradable compound, but it may have undesirable toxicity issues.

In some embodiments, suitable chelating agents may include biodegradable chelating agents such as, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof.

In an alternative embodiment, the metal-complexing agent may be a suitable sequestering agent such as polysuccinimide, polyaspartic acid, and polymers, oligomers, chains or block-copolymers of the twenty two essential amino acids containing metal complexing groups such as carboxylic acids, phosphoric acids, sulfonic acids and boronic acids.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussions regarding ranges and numerical data. Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 4 percent to about 7 percent" should be interpreted to include not only the explicitly recited values of about 4 percent to about 7 percent, but also include individual values and sub-ranges within the indicated range. Thus, included in this numerical range are individual values such as 4.5, 5.25 and 6 and sub-ranges such as from 4-5, from 5-7, and from 5.5-6.5; etc. This same principle applies to ranges reciting only one numerical value. Furthermore, such an interpretation should apply regardless of the breadth of the range or the characteristics being described.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope of the present invention. Numerous other changes may be made which will readily suggest themselves to those skilled in the art and which are encompassed in the spirit of the disclosure.

What is claimed is:

1. A slick-water fracturing fluid comprising:
   a friction reducer; and
   a time-released form of a metal complexing agent, wherein the metal complexing agent is encapsulated by a coating, the coating being a porous cross-linked hydrophilic polymer.

2. The slick-water fracturing fluid of claim 1, wherein the metal complexing agent is citric acid.

3. The slick-water fracturing fluid of claim 2, wherein the coating includes a second coating, the second coating being a paraffin coating.

4. The slick-water fracturing fluid of claim 2, wherein the coating includes a second coating, the second coating being a cottonseed oil coating.

5. The slick-water fracturing fluid of claim 1, wherein the metal complexing agent is present in the slick-water fracturing fluid in an amount of about 0.1 pound per thousand gallons to about 50 pounds per thousand gallons.

6. The slick-water fracturing fluid of claim 5, wherein the metal complexing agent is present in the slick-water fracturing fluid in an amount of about 0.5 pound per thousand gallons to about 25 pounds per thousand gallons.

7. The slick-water fracturing fluid of claim 5, wherein the metal complexing agent is present in the slick-water fracturing fluid in an amount of about 2 pounds per thousand gallons to about 5 pounds per thousand gallons.

8. A method for slick-water fracturing, comprising:
   adding a time-released form of a metal-complexing agent to a slick-water fracturing fluid wherein the metal complexing agent is encapsulated by a coating, the coating being a porous cross-linked hydrophilic polymer,
   wherein the time-release form of the metal-complexing agent is added in an amount of about 0.1 pound per thousand gallons to about 50 pounds per thousand gallons; and
   introducing the combined slick-water fracturing fluid and time-released form of a metal complexing agent into a subterranean zone.

9. The method for slick-water fracturing of claim 8, wherein the metal-complexing agent is a biodegradable chelating agent.

10. The method for slick-water fracturing of claim 9, wherein the metal-complexing agent is citric acid.

11. The method for slick-water fracturing of claim 10, wherein the time-released form of the metal-complexing agent is added in an amount of about 0.5 pound per thousand gallons to about 25 pounds per thousand gallons.

12. The method for slick-water fracturing of claim 11, the time-release form of the metal-complexing agent is added in an amount of about 2 pounds per thousand gallons to about 5 pounds per thousand gallons.

13. A slick-water fracturing fluid comprising:
   a friction reducing polymer; and
   a time-released form of a metal complexing agent, wherein the time released form of the metal complexing agent is present in the slick-water fracturing fluid at about 0.1 pound per thousand gallons to about 50 pounds per thousand gallons,
   wherein the time-released form of the metal complexing agent is encapsulated with a coating, the coating being a porous cross-linked hydrophilic polymer.

14. The slick-water fracturing fluid of claim 13, wherein the time-released metal complexing agent is solid citric acid.

15. The slick-water fracturing fluid of claim 14, wherein the coating includes a second coating, the second coating being a dry hydrophobic film forming material.

16. The slick-water fracturing fluid of claim 14, wherein the time released form of the metal complexing agent is present in the slick-water fracturing fluid at about 0.5 pounds per thousand gallons to about 25 pounds per thousand gallons.

17. The slick-water fracturing fluid of claim 15, wherein the time released form of the metal complexing agent is present in the slick-water fracturing fluid at about 2 pounds per thousand gallons to about 5 pounds per thousand gallons.

18. A slick-water fracturing fluid comprising:
a friction reducer; and
a time-released form of a metal complexing agent, wherein the metal complexing agent is present in the slick-water fracturing fluid in an amount of about 0.1 pounds per thousand gallons to about 5 pounds per thousand gallons.

* * * * *